Figure 1:
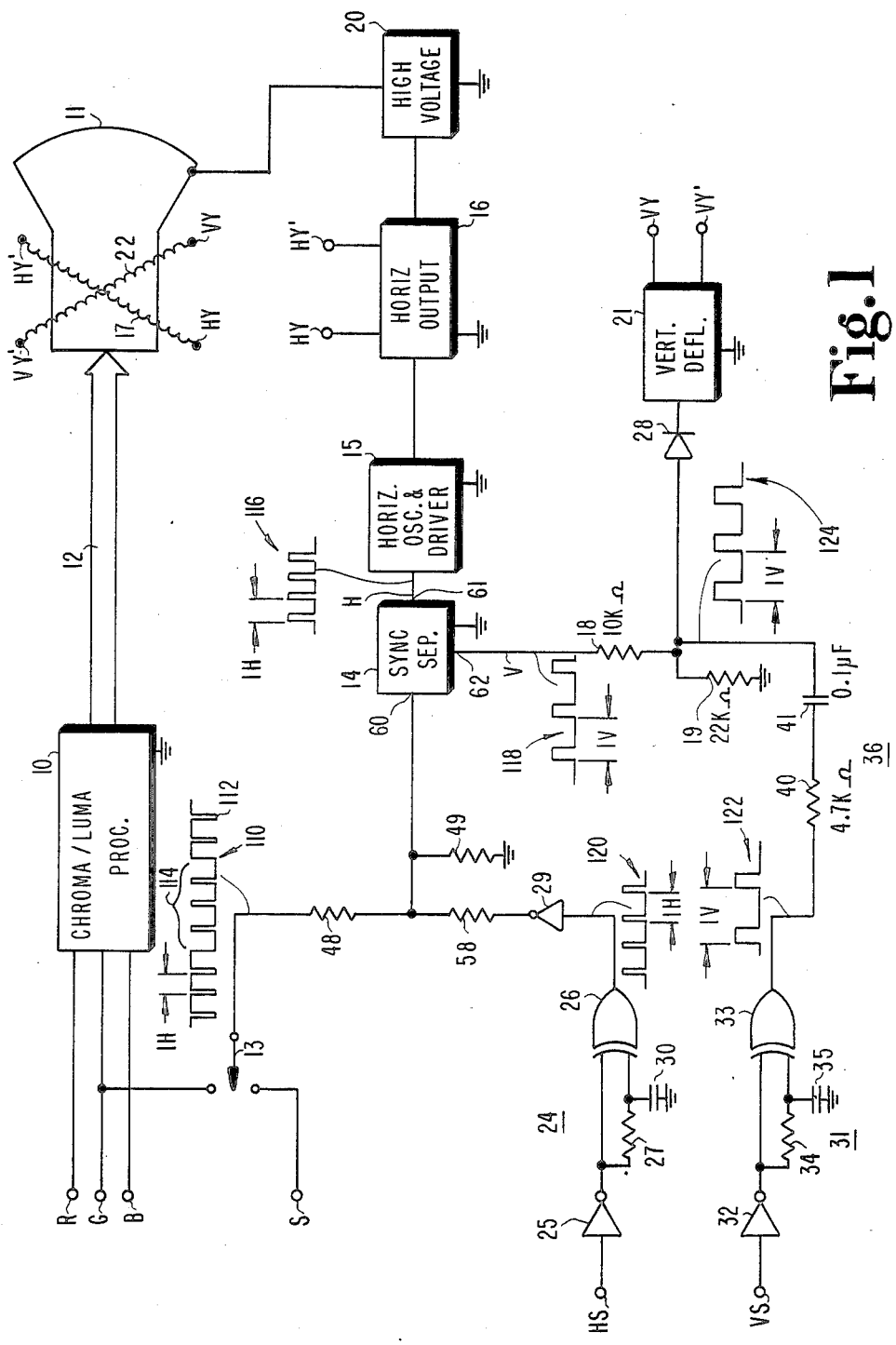

United States Patent [19]

Sendelweck

[11] Patent Number: 4,709,267

[45] Date of Patent: Nov. 24, 1987

[54] SYNCHRONIZING CIRCUIT WITH IMPROVED INTERLACE ARRANGEMENT

[75] Inventor: Gene K. Sendelweck, Indianapolis, Ind.

[73] Assignee: RCA Corporation, Princeton, N.J.

[21] Appl. No.: 796,046

[22] Filed: Nov. 7, 1985

[51] Int. Cl.$^4$ .............................................. H04N 5/04
[52] U.S. Cl. .................................... 358/148; 358/153
[58] Field of Search .............. 358/148, 188, 150, 153, 358/154, 181, 149, 165, 152; 340/814

[56] References Cited

U.S. PATENT DOCUMENTS

| 4,460,918 | 7/1984 | Flasza | 358/181 |
| 4,568,979 | 2/1986 | Takagi | 358/165 |
| 4,583,119 | 4/1986 | Roscoe | 358/150 |

FOREIGN PATENT DOCUMENTS

| 2147771 | 5/1985 | United Kingdom | 358/150 |

Primary Examiner—James J. Groody
Assistant Examiner—David E. Harvey
Attorney, Agent, or Firm—Paul J. Rasmussen; Joseph J. Laks; Scott J. Stevens

[57] ABSTRACT

A synchronizing circuit for a video display apparatus provides inputs for a composite sync signal or separate horizontal and vertical sync signals. The composite sync signal and the separate horizontal sync signal are applied to a sync separator that provides horizontal and vertical sync pulses in response to a composite sync input or horizontal sync pulses in response to a separate horizontal sync input. The separate vertical sync input is caused to bypass the sync separator. The bypass circuitry provides that the separate vertical sync input will take precedence over the separated vertical sync pulses of a composite sync signal in the event both signals are present.

4 Claims, 2 Drawing Figures

SYNCHRONIZING CIRCUIT WITH IMPROVED INTERLACE ARRANGEMENT

This invention relates to video display apparatus and, in particular, to video display apparatus that incorporates separate horizontal and vertical synchronizing pulse inputs.

A video display apparatus, such as a television receiver or a computer monitor, includes a cathode ray tube incorporating an electron gun assembly that produces one or more electron beams. The beams are scanned or deflected in a predetermined manner by electromagnetic fields produced by a deflection yoke to form a raster on the phosphor display screen of the cathode ray tube (CRT). The electron beam intensity is modulated in response to a video signal to produce the desired video information on the CRT display screen. The deflection of the electron beams must be synchronized with the occurrence of the video or picture information of the video signal to provide proper alignment of the video information from line to line and field to field.

When used as a computer monitor, the video display apparatus may receive synchronizing (sync) information as a composite horizontal and vertical sync signal or as separate sync signals. In a typical application, the monitor will operate in a progressive scan manner in which the video information in each vertical scan interval represents a separate video frame.

In order to improve the apparent vertical resolution of the video display, it may be desirable to operate the monitor in an interlaced manner in which succeeding vertical scan intervals are displayed as line-interlaced fields. Since the computer may not generate composite sync information with the equalization pulses necessary for satisfactory interlaced operation, the use of the monitor in an interlaced manner requires separate horizontal and vertical sync signals.

In order to reduce the cost and complexity of the video display apparatus, it is desirable to be ble to accept either composite sync or separate horizontal and vertical sync signals without adding complex sync selection and switching circuitry. It is also desirable that the video display apparatus operate properly in response to any of the possible sync inputs and that separate sync inputs take precedence over composite sync in the event both are present.

In accordance with an aspect of the present invention, a synchronizing circuit for a video apparatus comprises a source of first synchronizing signals having line and field rate synchronizing signal components. Circuitry is coupled to the sync signal source and processes the first sync signals to develop a first field-rate synchronizing signal synchronizing the operation of the video apparatus. A second sync signal source produces sync signals having separate line rate and field rate sync signals. A circuit bypasses the sync signal processor with respect to the separate field rate sync signals to provide a second field rate synchronizing signal for synchronizing the operation of the video apparatus. The bypassing circuit provides the second field rate sync signal in preference over the first field rate sync signal when both the first and second field rate sync signals are present.

Figure 2:
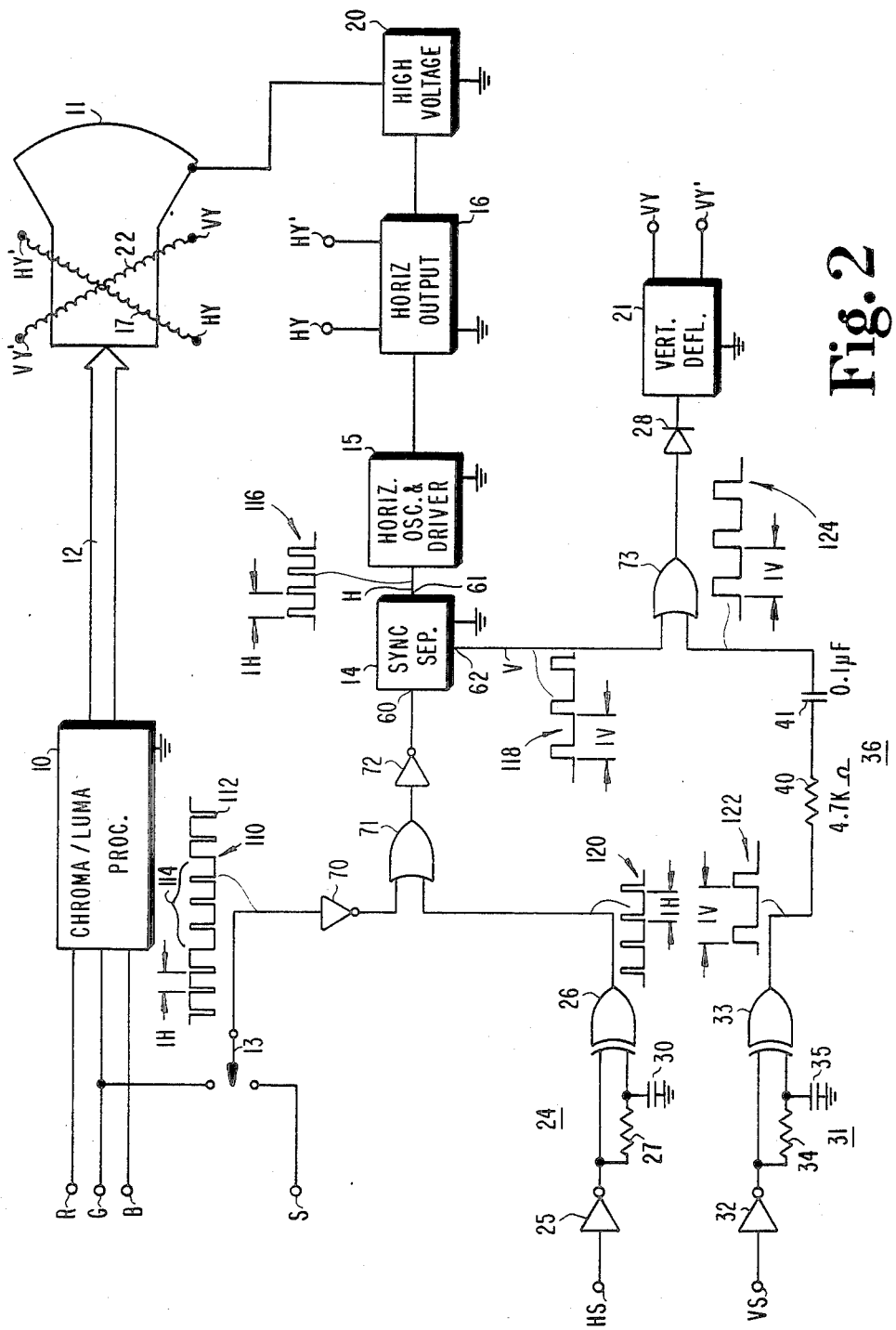

In the accompanying drawing,

FIG. 1 is a block and schematic diagram of a portion of a video display apparatus incorporating a synchronizing circuit in accordance with an aspect of the present invention; and FIG. 2 is a block and schematic diagram of another embodiment in accordance with an aspect of the present invention.

In the circuit shown in FIG. 1, separate red, green and blue video signals are provided via conductors designated R, G, and B from a source of video signals (not shown), such as a computer. The RGB video signals are applied to a chrominance and luminance processing circuit 10, which generates color drive signals for a cathode ray tube 11 via a conductor 12.

Horizontal and vertical synchronizing (sync) signals may be provided as a composite sync signal illustratively associated with the green video input signal, and shown as the sync signal portion of the video signal in FIG. 1, or as a separate composite sync signal at an input designated S. A switch 13 illustratively selects the sync-on-green or the separate composite sync input as the source of composite sync.

The composite sync signal 110, comprising horizontal sync components 112 and a serrated vertical sync component 114, is applied via a voltage divider comprising resistors 48 and 49 to an input terminal 60 of a sync separator circuit 14 which produces separate horizontal sync pulses 116 at a terminal 61 and separate vertical sync pulses 118 at a terminal 62. The horizontal sync pulses 116 are applied via a conductor H to horizontal oscillator and drive circuitry 15 which generates synchronized horizontal drive pulses for a horizontal deflection output circuit 16. Horizontal deflection output circuit 16 produces horizontal or line rate deflection current via terminals HY and HY' in a horizontal deflection winding 17 located on the neck of cathode ray tube 11. Horizontal output circuit 16, which may be illustratively of the resonant retrace type, also produces retrace pulses which are applied to high voltage generating circuitry 20 which produces the high voltage or ultor potential for cathode ray tube 11. The vertical sync pulses 118, on a conductor V, are applied, via a voltage divider comprising resistors 18 and 19, and diode 28, to a vertical deflection circuit 21 which produces vertical deflection current via terminals VY and VY' in a deflection winding 22 also located on the neck of cathode ray tube 11. Sync separator 14 and horizontal oscillator and driver circuitry 15 may be incorporated as part of an integrated circuit.

The synchronizing signals may also be provided as separate horizontal, or line rate, and vertical, or field rate, signals at terminals designated HS and VS respectively. The horizontal sync signal is applied to a sync processing circuit 24 comprising inverter 25, EXCLUSIVE OR gate 26, resistor 27 and capacitor 30. The vertical sync signal is applied to a similar sync processing circuit 31, comprising inverter 32, EXCLUSIVE OR gate 33, resistor 34 and capacitor 35. The operation of sync processing circuits 24 and 31, which provide a fixed polarity sync pulse output independent of sync pulse input polarity, is explained in detail in U.S. patent application Ser. No. 753,502, filed July 10, 1985, in the name of G. K. Sendelweck and entitled "Synchronizing Signal Processor", herein incorporated by reference.

For a negative-going horizontal sync signal at terminal HS, for example, capacitor 30 of sync processing circuit 24 will charge to a HIGH input level at one input of EXCLUSIVE OR gate 26, since the duty cycle of the negative-going low level pulses is short compared to the high level signal present between the occurrence of the sync pulses. The presence of a sync pulse will then produce a LOW level at the other input of EXCLUSIVE OR gate 26. The output of EXCLUSIVE OR gate 26 will then be HIGH during a sync pulse and LOW otherwise. Alternately, for positive-going sync pulses, the voltage developed across capacitor 30 will present a LOW level to EXCLUSIVE OR gate 26. The presence of a positive-going sync pulse will then result in a HIGH output signal for EXCLUSIVE OR gate 26. Sync processor 31 operates in a similar manner.

The horizontal sync pulse signal 120 from sync processing circuit 24 is applied via an inverter 29 and a voltage divider comprising resistors 58 and 49 to sync separator circuit 14 which generates a corresponding sync signal that, as previously described, is applied to horizontal oscillator and driver circuitry 15.

In accordance with an aspect of the present invention, the vertical sync pulse signal 122 from sync processing circuit 31 is applied to a synchronizing signal bypass circuit 36, comprising a resistor 40 and a capacitor 41. The vertical sync signal 124 from sync signal bypass circuit 36 is applied to vertical deflection circuit 21 via diode 28. Capacitor 41 decouples the DC voltage levels at the output of EXCLUSIVE OR gate 33 and the input of vertical deflection circuit 21. Resistor 40 provides impedance back to sync processing circuit 31 in the event composite sync is present.

Composite sync generated by a computer typically does not include equalization pulses. Although this presents no problems when the video display apparatus operates in a progressive scan mode, operation in an interlaced mode may produce undesirable visual effects, i.e., unequal line interlace, due to integrating circuity used to separate vertical sync. Without equalizing pulses, the integrator will not begin integrating successive vertical sync pulses from the same DC voltage base level, with the result that the threshold-sensing sync output circuit produces vertical sync pulses after different integration durations for alternate vertical intervals. Operation in an interlaced mode will therefore require separate vertical synchronizing signals. As can be seen in FIG. 1, the horizontal sync signal is applied to sync separator 14 in the event either composite sync or separate horizontal sync is provided. However, separate vertical sync signals are caused to bypass sync separator 14 by action of sync signal bypass circuit 36 and are applied directly to vertical deflection circuit 21.

Because of its integrating method of operation, sync separator 14 provides some delay in triggering vertical deflection circuit 21 with the separated vertical sync output pulses 118 compared to the vertical sync pulse component 114 of the composite sync input signal 110. Sync signal bypass circuit 36, on the other hand, will cause the vertial deflection circuit 21 to be triggered by the leading edge of the vertical sync pulses of the separate vertical sync signal 124. This results in the event that both composite sync and a separate vertical sync signal is provided, the separate vertical sync signal 124 will be applied to and trigger vertical deflection circuit 21 earlier that the separated vertical sync pulses 118 so that the separate vertical sync signal will always take precedence over the vertical sync pulses of a composite sync signal. In the event an interlaced mode of operation is selected, therefore, the synchronizing circuit of the FIG. 1 will automatically provide proper triggering of the vertical deflection circuit to insure proper line interlace.

FIG. 2 shows another embodiment of a video apparatus similar to that shown in FIG. 1, in which corresponding elements are designated with the same reference numerals. Referring to FIG. 2, the negative-going composite sync signal 110 is applied via an inverter 70 to one input of an OR gate 71. The horizontal sync pulse signal 120 from sync processor 24 is applied to the other input of OR gate 71. The output of OR gate 71 is applied to input 60 of sync separator 14 via an inverter 72. OR gate 71 provides a single horizontal or line rate sync pulse signal to sync separator 14 in the event both composite sync and separate sync are present.

Vertical sync pulses 118 are applied to one input of an OR gate 73. The other input of OR gate 73 is coupled to the output of sync signal bypass circuit 36. OR gate 73 will also provide a single sync pulse signal to vertical deflection circuit 21, in a manner similar to the operation of OR gate 71. The presence of a separate vertical sync signal at terminal VS will cause the output signal of OR gate 73 to be determined in response to the output of bypass circuit 36, rather than the vertical sync pulses 118 from output terminal 62 of sync separator 14. This will cause vertical deflection circuit 21 to be triggered in response to the separate vertical sync signal in preference to the separated vertical sync signal, in a manner similar to that described with respect to FIG. 1.

What is claimed is:

1. A synchronizing circuit for a video apparatus comprising:
    means for receiving first synchronizing signals having line rate and field rate synchronizing signal components;
    means for receiving second synchronizing signals having separate line rate and field rate synchronizing signals;
    means coupled to said means for receiving said first synchronizing signals and to said means for receiving said second synchronizing signals for processing said first synchronizing signals and said separate line rate synchronizing signals to develop a first line rate synchronizing signal for synchronizing the operation of said video apparatus and a first field rate synchronizing signal;
    means for receiving said separate field rate synchronizing signal and said first field rate synchronizing signal and providing said separate field rate synchronizing signal or said first field rate synchronizing signal for synchronizing the operation of said video apparatus, said separate field rate synchronizing signal being provided over said first field rate synchronizing signal when both said first and said separate field rate synchronizing signals are present.

2. The arrangement defined in claim 1, further comprising means for applying said separate line rate synchronizing signal to said first synchronizing signal processing means.

3. The arrangement defined in claim 1, wherein said means for receiving said second synchronizing signals comprises means responsive to a synchronizing signal of undetermined polarity for providing separate line rate and field rate synchronizing signals having a predetermined polarity.

4. A synchronizing circuit for a video apparatus comprising:
    means for receiving composite synchronizing signals incorporating line and field rate synchronizing components;

means for receiving separate line rate synchronizing signals;

means for receiving separate field rate synchronizing signals;

a synchronizing signal separator comprising:
  an input terminal;
  a line rate synchronizing pulse output terminal; and
  a field rate synchronizing pulse output terminal;

means coupling said composite synchronizing signals to said input terminal of said synchronizing signal separator for developing line rate synchronizing pulses at said line rate synchronizing pulse output terminal and field rate synchronizing pulses at said field rate synchronizing pulse output terminal;

means coupling said separate line rate synchronizing signals to said input terminal of said synchronizing signal separator for developing line rate synchronizing pulses at said line rate synchronizing pulse output terminal; and means coupling said separate field rate synchronizing signals to said field rate synchronizing pulse output terminal for combining said separate field rate synchronizing signals and said field rate synchronizing pulses provided at said field rate synchronizing pulse output terminal.

* * * * *